(12) United States Patent
Muramatsu

(10) Patent No.: US 10,178,532 B2
(45) Date of Patent: Jan. 8, 2019

(54) COMMUNICATION METHOD, COMMUNICATION SYSTEM, AND COMMUNICATION MANAGEMENT APPARATUS

(71) Applicant: FUJITSU LIMITED, Kawasaki-shi, Kanagawa (JP)

(72) Inventor: Atsushi Muramatsu, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/867,556

(22) Filed: Sep. 28, 2015

(65) Prior Publication Data

US 2016/0192180 A1    Jun. 30, 2016

(30) Foreign Application Priority Data

Dec. 24, 2014   (JP) ................................. 2014-261296

(51) Int. Cl.
| | |
|---|---|
| *H04W 4/80* | (2018.01) |
| *H04W 8/00* | (2009.01) |
| *H04W 88/04* | (2009.01) |

(52) U.S. Cl.
CPC ............. *H04W 4/80* (2018.02); *H04W 8/005* (2013.01); *H04W 88/04* (2013.01)

(58) Field of Classification Search
CPC ..... H04W 88/02; H04W 88/022; H04W 4/80; H04W 8/005; H04W 88/04; H04L 12/2856

(Continued)

(56) References Cited

U.S. PATENT DOCUMENTS

| 8,751,670 B2 * | 6/2014 | Xu ........................... H04L 69/32 370/401 |
| 8,819,445 B2 * | 8/2014 | Schrecker ............... G06F 21/31 713/185 |

(Continued)

FOREIGN PATENT DOCUMENTS

| JP | 11-262061 | 9/1999 |
| JP | 2004-7351 | 1/2004 |

(Continued)

OTHER PUBLICATIONS

Notification of Reasons for Refusal for Japanese Application number for Patent Application No. 2014-261296 dated Nov. 6, 2018.

*Primary Examiner* — Julio Perez

(74) *Attorney, Agent, or Firm* — Staas & Halsey LLP

(57) ABSTRACT

A communication method using a communication system including a first communication apparatus, a second communication apparatus, and a communication management apparatus, the communication method includes acquiring, by the communication management apparatus, communication information used for the first communication apparatus to be coupled to a communication network via the second communication apparatus, from the first communication apparatus or the second communication apparatus, transmitting, by the communication management apparatus, the communication information to the first communication apparatus or the second communication apparatus, and based on the transmitted communication information, establishing communication between the first communication apparatus and the second communication apparatus by the first communication apparatus and the second communication apparatus.

15 Claims, 20 Drawing Sheets

(58) Field of Classification Search
USPC .............................................. 455/41.1, 41.2
See application file for complete search history.

(56) References Cited

U.S. PATENT DOCUMENTS

| | | | |
|---|---|---|---|
| 2005/0272371 A1 | 12/2005 | Komatsuzaki et al. | |
| 2007/0140272 A1* | 6/2007 | Gulliksson | H04L 12/2856 |
| | | | 370/401 |
| 2008/0090595 A1* | 4/2008 | Liu | H04L 63/102 |
| | | | 455/461 |
| 2011/0176524 A1 | 7/2011 | Fasbender et al. | |
| 2012/0238206 A1* | 9/2012 | Singh | H04L 63/0492 |
| | | | 455/41.1 |
| 2014/0045547 A1* | 2/2014 | Singamsetty | G06F 1/1643 |
| | | | 455/552.1 |
| 2014/0240087 A1* | 8/2014 | Liu | G07C 9/00103 |
| | | | 340/5.54 |
| 2014/0362991 A1* | 12/2014 | Ebrom | H04W 12/04 |
| | | | 380/270 |

FOREIGN PATENT DOCUMENTS

| | | |
|---|---|---|
| JP | 2006-174320 | 6/2006 |
| JP | 2007-293811 | 11/2007 |
| JP | 2010-178054 | 8/2010 |
| JP | 2011-525306 | 9/2011 |
| JP | 2014-60623 | 4/2014 |

\* cited by examiner

FIG. 8

| DEVICE NAME | MAC ADDRESS | DEVICE FUNCTION NAME |
|---|---|---|
| X | 00:FF:EE:33:44:55 | Gateway |
| headset 1 | 00:11:22:33:44:55 | HSP |
| keyboard A | 11:22:00:33:44:55 | HID |

61A — DEVICE NAME
61B — MAC ADDRESS
61C — DEVICE FUNCTION NAME

FIG. 18

| DEVICE NAME | MAC ADDRESS | DEVICE FUNCTION NAME | GROUP ID |
|---|---|---|---|
| X | 00:FF:EE:33:44:55 | Gateway | 1 |
| Z | 00:FF:EE:33:44:58 | Gateway | 2 |
| headset 1 | 00:11:22:33:44:55 | HSP | 2 |
| keyboard A | 11:22:00:33:44:55 | HID | 2 |
| keyboard Z | 11:22:00:33:49:55 | HID | 1 |

61A 61B 61C 61D

COMMUNICATION METHOD, COMMUNICATION SYSTEM, AND COMMUNICATION MANAGEMENT APPARATUS

CROSS-REFERENCE TO RELATED APPLICATION

This application is based upon and claims the benefit of priority of the prior Japanese Patent Application No. 2014-261296, filed on Dec. 24, 2014, the entire contents of which are incorporated herein by reference.

FIELD

The embodiments discussed herein are related to a communication method, a communication system, and a communication management apparatus.

BACKGROUND

Wearable devices such as, for example, wristbands, headphones, eyeglasses, and wristwatches, so-called gadget devices (hereinafter, simply called devices), are known. In order to reduce power consumption thereof, these devices each adopt a near field wireless communication function in some cases. In a case of performing communication with an external service such as the Internet, the devices each use, for example, a gateway (GW) such as a smartphone and establishes near field wireless communication with the GW, thereby performing communication with the external service such as the Internet via the GW. As a result, the devices each perform communication with the external service via the GW.

It is desirable for a user of each of the devices to preliminarily set device information, used for identifying the relevant device, within the GW used to perform communication between the relevant device and the external service. The GW references the set device information and establishes wireless communication with the relevant device. As documents of the related art, there are Japanese Laid-open Patent Publication No. 11-262061, Japanese National Publication of International Patent Application No. 2011-525306, Japanese Laid-open Patent Publication No. 2006-174320, and Japanese Laid-open Patent Publication No. 2007-293811.

SUMMARY

According to an aspect of the invention, a communication method using a communication system including a first communication apparatus, a second communication apparatus, and a communication management apparatus, the communication method includes acquiring, by the communication management apparatus, communication information used for the first communication apparatus to be coupled to a communication network via the second communication apparatus, from the first communication apparatus or the second communication apparatus, transmitting, by the communication management apparatus, the communication information to the first communication apparatus or the second communication apparatus, and based on the transmitted communication information, establishing communication between the first communication apparatus and the second communication apparatus by the first communication apparatus and the second communication apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is an explanatory diagram illustrating an example of a coupling list;

FIG. 18 is an explanatory diagram illustrating an example of a coupling list;

DESCRIPTION OF EMBODIMENTS

Since it is desirable to preliminarily set, within a GW, communication information such as device information for each of devices, the complexity of a setting work therefor increases with an increase in the number of devices coupled to the GW. Furthermore, in a case where users each use different GWs based on usage scenes such as, for example, private use, public use, in doors, and out of doors, it is desirable to set the device information of each of the devices for each of the GWs.

First Example

Figure 1:
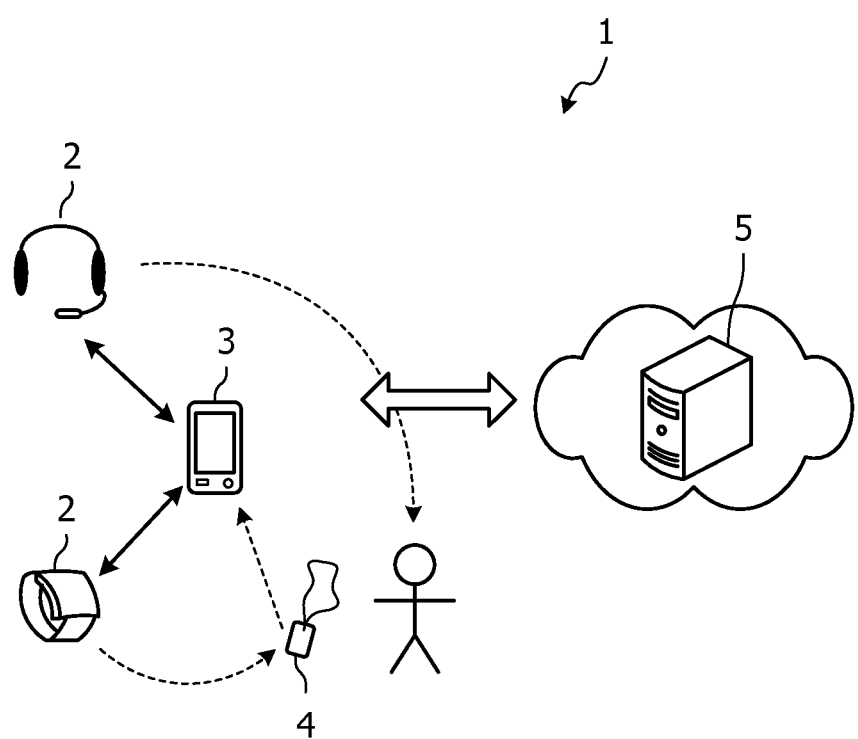
FIG. 1 is an explanatory diagram illustrating an example of a device communication system of a first example.

FIG. 1 is an explanatory diagram illustrating an example of a device communication system 1 of a first example. The device communication system 1 illustrated in FIG. 1 includes devices 2, a GW 3, and an authentication apparatus 4. Each of the devices 2 is, for example, a gadget device that performs, using the GW 3, communication with a server 5 on the Internet serving as an external service.

Figure 2:
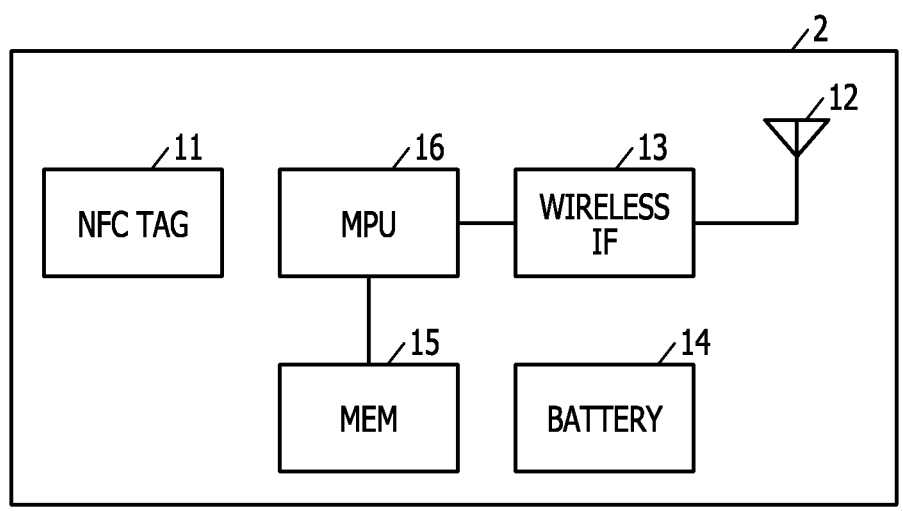
FIG. 2 is a block diagram illustrating an example of a hardware configuration of a device.

FIG. 2 is a block diagram illustrating an example of each of the devices 2. Each of the devices 2 illustrated in FIG. 2 is a first terminal that is a gadget device or the like, such as, for example, headphones or a wristwatch, equipped with a wireless communication function such as Bluetooth Low Energy (BTLE) (registered trademark). The devices 2 each include a near field communication (NFC) tag 11, a wireless antenna 12, a wireless Interface (IF) 13, a battery 14, a memory (MEM) 15, and a microprocessor unit (MPU) 16.

The NFC tag 11 stores therein device information for identifying the corresponding device 2 itself. Note that the device information is destination information such as, for example, a media access control (MAC) address or a personal identification number (PIN) code, used for wireless communication. The wireless IF 13 is, for example, an interface that manages wireless communication, based on a BTLE standard, with the GW 3. The battery 14 is a power source for the corresponding device 2. The MEM 15 is an area for storing various kinds of information. The MPU 16 controls the entire corresponding device 2.

Figure 3:
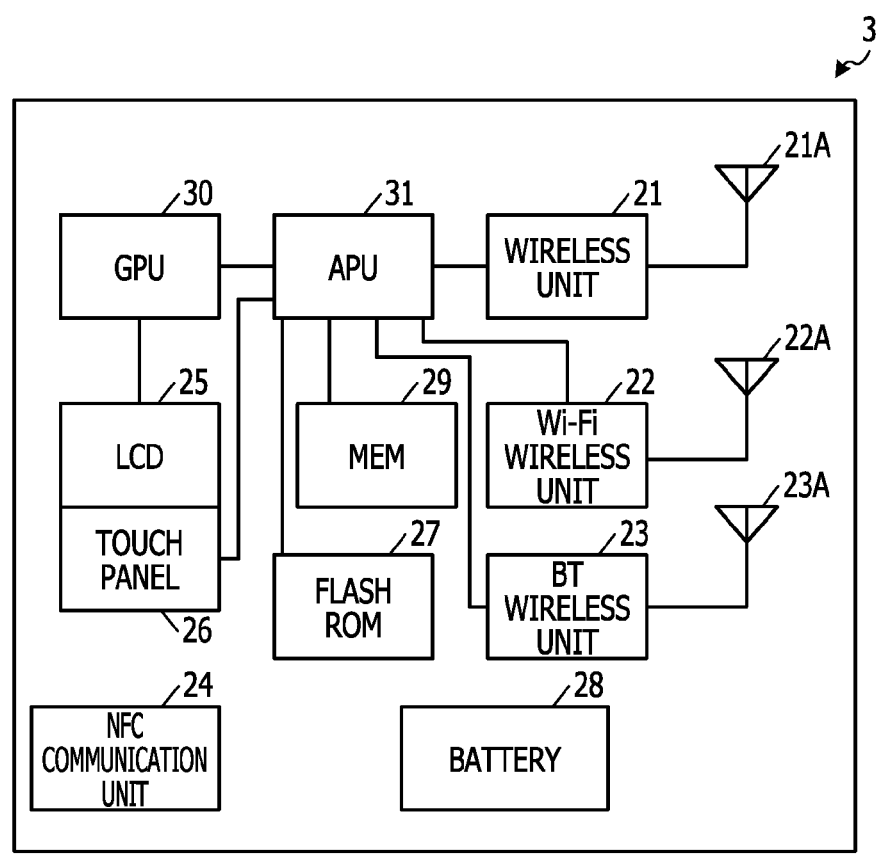
FIG. 3 is a block diagram illustrating an example of a hardware configuration of a GW.

FIG. 3 is a block diagram illustrating an example of the GW 3. The GW 3 illustrated in FIG. 3 includes a wireless unit 21, a Wi-Fi (registered trademark) wireless unit 22, a Bluetooth (BT) (registered trademark) wireless unit 23, an NFC communication unit 24, a liquid crystal display (LCD) 25, and a touch panel 26. The GW 3 includes a flash read only memory (ROM) 27, a battery 28, a MEM 29, a graphical processor unit (GPU) 30, and an application processor unit (APU) 31. The GW 3 is a second terminal such as, for example, a smartphone. Note that the GW 3 may be an information processing apparatus such as a tablet terminal or a personal computer, equipped with a communication function.

The wireless unit 21 is a communication unit that performs wireless communication via a wireless antenna 21A. The Wi-Fi wireless unit 22 is a communication unit that performs wireless communication, based on a Wi-Fi standard, via a Wi-Fi antenna 22A. The BT wireless unit 23 is a communication unit that performs wireless communication, based on a BT standard or a BTLE standard, via a BT antenna 23A. The NFC communication unit 24 corresponds to a communication unit that performs wireless communication based on an NFC standard and includes, for example, an NFC tag, not illustrated, and an NFC reader that reads an NFC tag on the other side. Note that it is assumed that the NFC tag stores therein, for example, a MAC address or a PIN code, used for wireless communication. The LCD 25 is an output interface that displays various kinds of information on a screen. The touch panel 26 is an input interface that inputs various kinds of information and commands. In the flash ROM 27, for example, a program for performing wireless communication with the authentication apparatus 4, a program for performing wireless communication with the devices 2, and so forth are stored.

Figure 4:
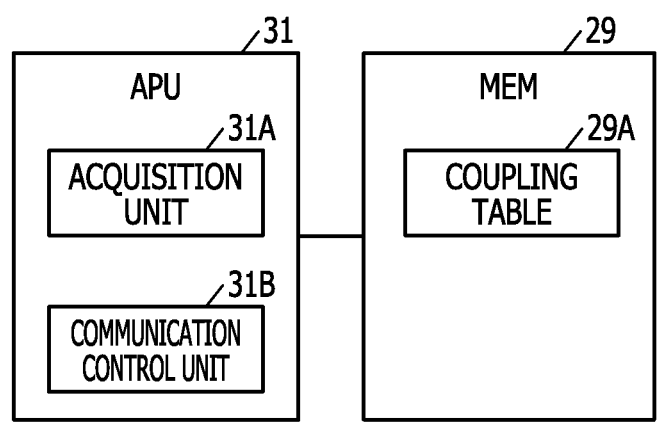
FIG. 4 is a block diagram illustrating an example of a functional configuration of an APU in the GW.

The battery 28 is a power source that supplies electric power to the entire GW 3. The MEM 29 is an area for storing various kinds of information. The GPU 30 is an image control unit that controls a displayed image on the LCD 25. The APU 31 is a control unit that controls the entire GW 3. The APU 31 reads a program stored in the flash ROM 27 and executes the read program on the MEM 29 as a process function. FIG. 4 is a block diagram illustrating an example of a functional configuration of the APU 31. The APU 31 illustrated in FIG. 4 includes an acquisition unit 31A and a communication control unit 31B. The acquisition unit 31A acquires, from the authentication apparatus 4, a coupling list of device information or the like by using BTLE communication. The communication control unit 31B controls the BT communication, the BTLE communication, wireless communication, the Wi-Fi communication, and NFC communication. The MEM 29 includes a coupling table 29A that stores therein a coupling list indicating a list of the devices 2 with which the GW 3 itself performs communication. Note that the coupling list includes a device name for identifying the corresponding device 2, a MAC address for identifying the corresponding device 2, and a function name for identifying a function of the corresponding device 2.

Figure 5:
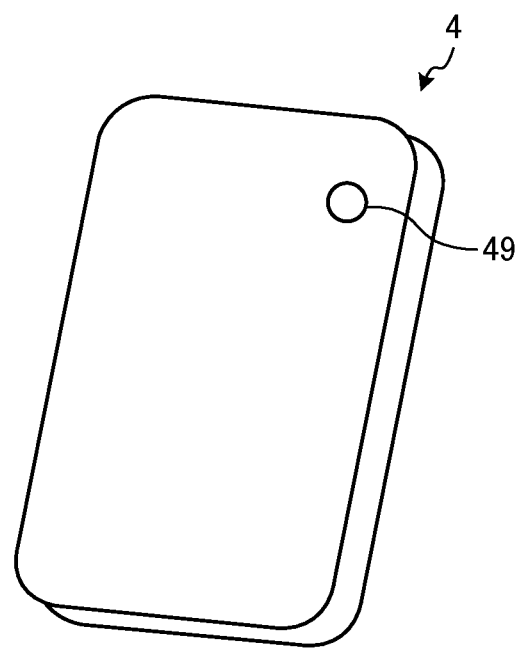
FIG. 5 is a block diagram illustrating an example of an external configuration of an authentication apparatus.
Figure 6:
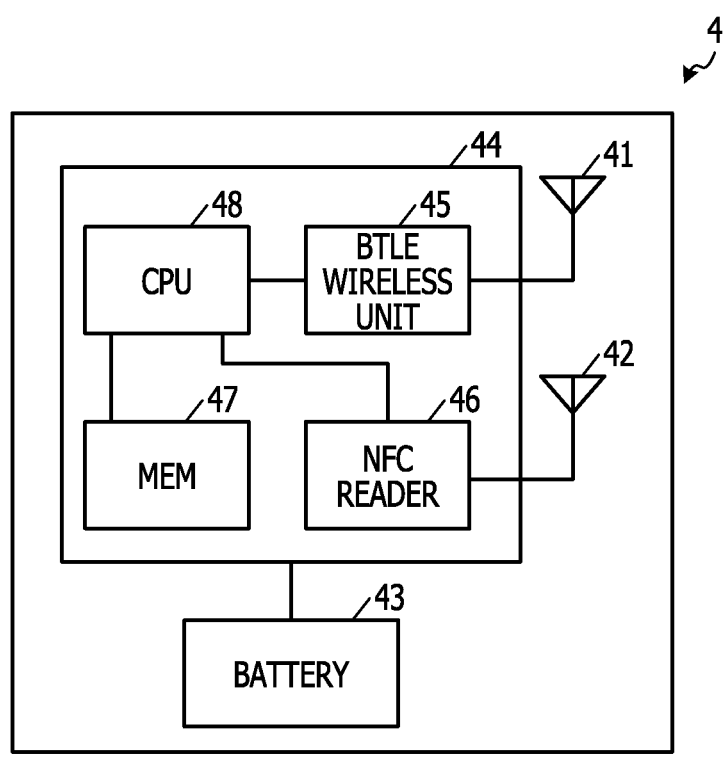
FIG. 6 is a block diagram illustrating an example of a hardware configuration of the authentication apparatus.
Figure 7:
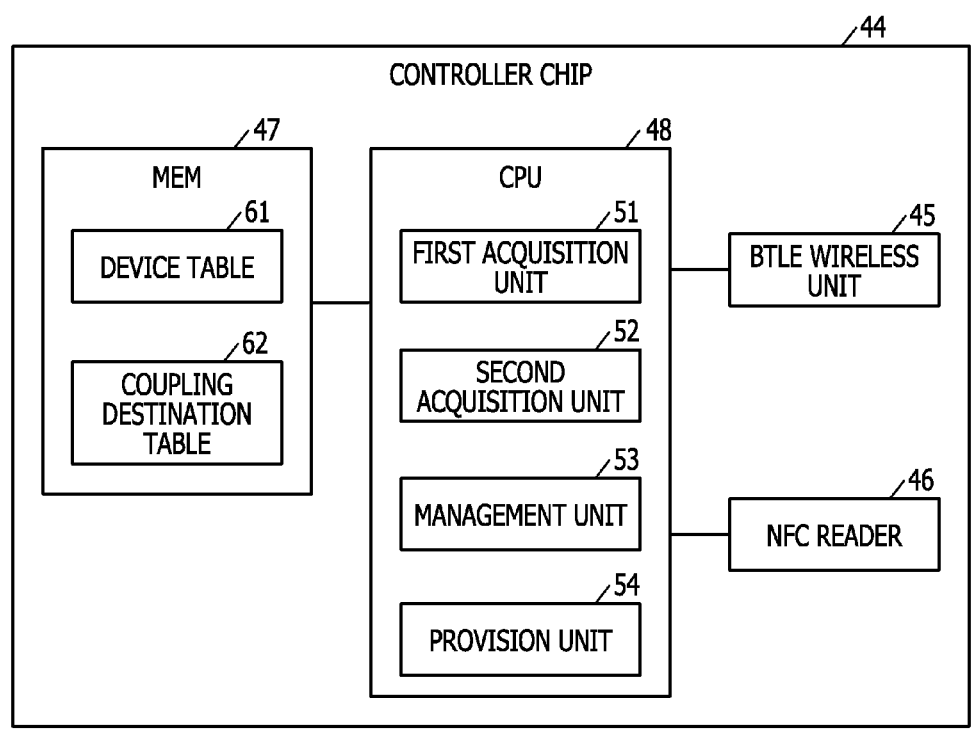
FIG. 7 is a block diagram illustrating an example of a configuration within a controller chip in the authentication apparatus.

FIG. 5 is an explanatory diagram illustrating an example of an external configuration of the authentication apparatus 4. The authentication apparatus 4 is, for example, a portable communication management apparatus including a button 49 for instructing to perform communication decoupling, communication exclusion, or the like of the corresponding device 2. FIG. 6 is a block diagram illustrating an example of the authentication apparatus 4. The authentication apparatus 4 illustrated in FIG. 6 includes a BTLE antenna 41, an NFC antenna 42, a battery 43, and a controller chip 44. The battery 43 is a power source that supplies electric power to the entire authentication apparatus 4. The controller chip 44 is a part that controls the entire authentication apparatus 4. FIG. 7 is an explanatory diagram illustrating an example of the controller chip 44. The controller chip 44 includes a BTLE wireless unit 45, an NFC reader 46, a MEM 47, and a central processor unit (CPU) 48. The BTLE wireless unit 45 performs BTLE communication with the GW 3 via the BTLE antenna 41. The NFC reader 46 performs NFC communication with the NFC tag 11 within each of the devices 2 and the NFC communication unit 24 within the GW 3. The MEM 47 is an area for storing various kinds of information. The CPU 48 controls the entire controller chip 44.

The authentication apparatus 4 manages all the devices 2 within the device communication system 1 and manages coupling destination information for identifying the GW 3 serving as a coupling destination of each of the devices 2 within the device communication system 1. The CPU 48 reads a program stored in the MEM 47 and executes the read program on the MEM 47 as a process function. The CPU 48 includes a first acquisition unit 51, a second acquisition unit 52, a management unit 53, and a provision unit 54. The first acquisition unit 51 acquires, via the NFC reader 46, device information from the device 2 serving as a communication target and existing within the device communication system 1. The first acquisition unit 51 acquires, from the device 2 serving as a communication target, a Bluetooth Secure Simple Paring Using NFC (BTSSP) tag for identifying the corresponding device 2 itself and acquires the acquired BTSSP tag as the device information. As a result, the authentication apparatus 4 is able to add, into a coupling list, new device information acquired by, for example, the first acquisition unit 51. The second acquisition unit 52 acquires, via the NFC reader 46, coupling destination information for identifying the GW 3 serving as a coupling destination of the corresponding device 2. Note that the coupling destination information is destination information such as a MAC address, a PIN code, or the like of the GW 3.

The MEM 47 includes a device table 61 and a coupling destination table 62. The device table 61 is an area for storing a coupling list indicating a list of the devices 2 serving as communication targets. FIG. 8 is an explanatory diagram illustrating an example of the coupling list. The coupling list illustrated in FIG. 8 manages a device name 61A indicating a name of the corresponding device 2, a MAC address 61B for identifying the address of the corresponding device 2, and a device function name 61C indicating a function of the corresponding device 2 while associating the device name 61A, the MAC address 61B, and the device function name 61C with one another. Note that it is assumed that the coupling list includes the GW 3 in addition to the devices 2. The CPU 48 references the coupling list and recognizes that a device name of "X" corresponds to, for example, a MAC address of "00:FF:EE:33:44:55" and a device function of "Gateway".

The coupling destination table 62 is an area that stores therein the coupling destination information for identifying the GW 3 serving as a coupling destination to which the corresponding device 2 is coupled. The management unit 53 stores, in the device table 61 within the MEM 47, the coupling list of the devices 2 and so forth serving as communication targets. The management unit 53 stores, in the coupling destination table 62 within the MEM 47, the coupling destination information for identifying the GW 3 serving as a coupling destination. The provision unit 54 is a setting unit that provides, to the corresponding device 2, the coupling destination information indicating the GW 3 serving as a coupling destination with which the corresponding device 2 itself performs communication, thereby setting the coupling destination information in the corresponding device 2.

The provision unit 54 is a setting unit that provides, to the GW 3 by using the BTLE communication, the coupling list of the devices 2 whose coupling destinations is the GW 3, thereby setting the coupling list in the GW 3. Note that the functions of the first acquisition unit 51, the second acquisition unit 52, the management unit 53, and the provision unit 54 within the CPU 48 may be realized by dedicated hardware and may be realized as additional software for existing hardware.

In a case of receiving the coupling list from the authentication apparatus 4 by using the BTLE communication, the GW 3 updates, with the coupling list, the coupling table 29A within the MEM 29. Based on the coupling list within the coupling table 29A, the GW 3 controls the BT communication with the devices 2.

Figure 9:
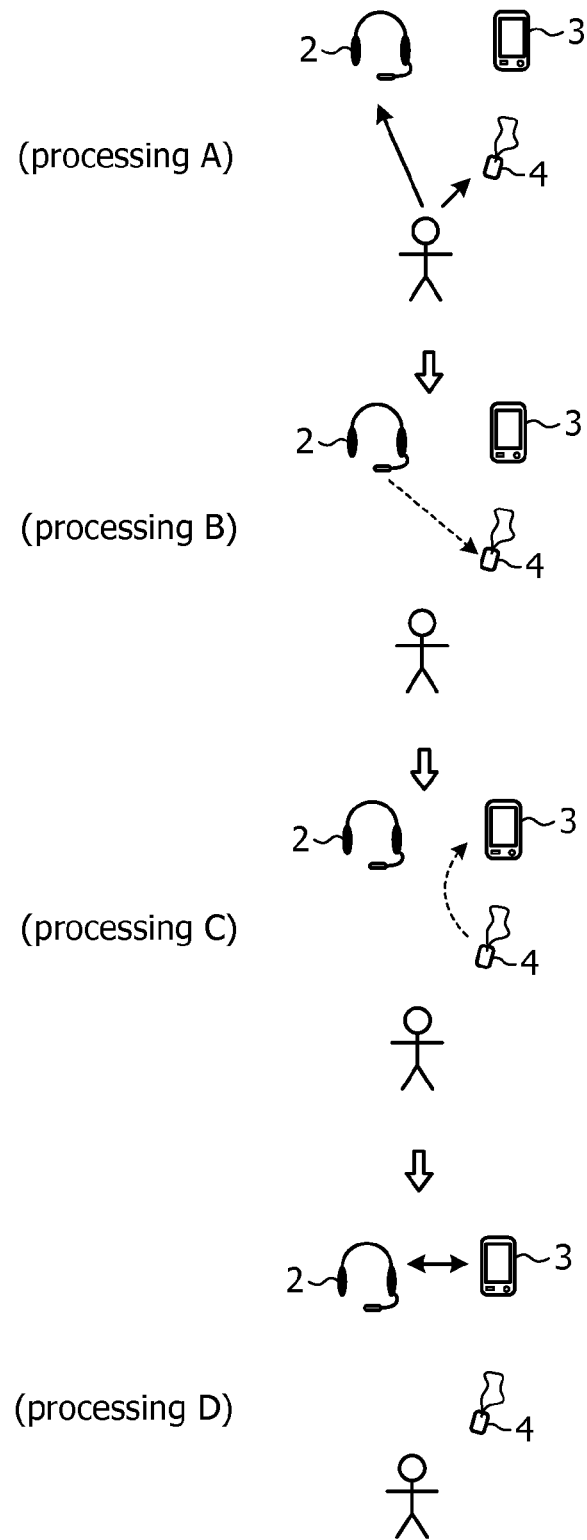
FIG. 9 is an explanatory diagram illustrating an example of an operation of communication establishment processing relating to the device communication system.

FIG. 9 is an explanatory diagram illustrating an example of an operation of communication establishment processing relating to the device communication system 1. In processing A in FIG. 9, the authentication apparatus 4 is close to, for example, the device 2 serving as an addition target and acquires, as the device information, the BTSSP tag of the device 2 serving as an addition target via the NFC reader 46. Note that an instruction issued to the authentication apparatus 4 to acquire the BTSSP tag may be issued by an instruction operation of, for example, a proximity sensor, a push button, a touch panel, or the like.

In processing B in FIG. 9, the authentication apparatus 4 acquires, as the device information, the BTSSP tag of the device 2 serving as an addition target and adds the acquired device information of the addition target to the coupling list. In processing C in FIG. 9, the authentication apparatus 4 notifies the GW 3 of the coupling list. In processing D in FIG. 9, in a case of receiving the coupling list from the authentication apparatus 4, the GW 3 establishes, based on the coupling list, BT communication with the device 2 serving as an addition target. As a result, the device 2 serving as an addition target is able to perform communication with the server 5 via the GW 3.

Figure 10:
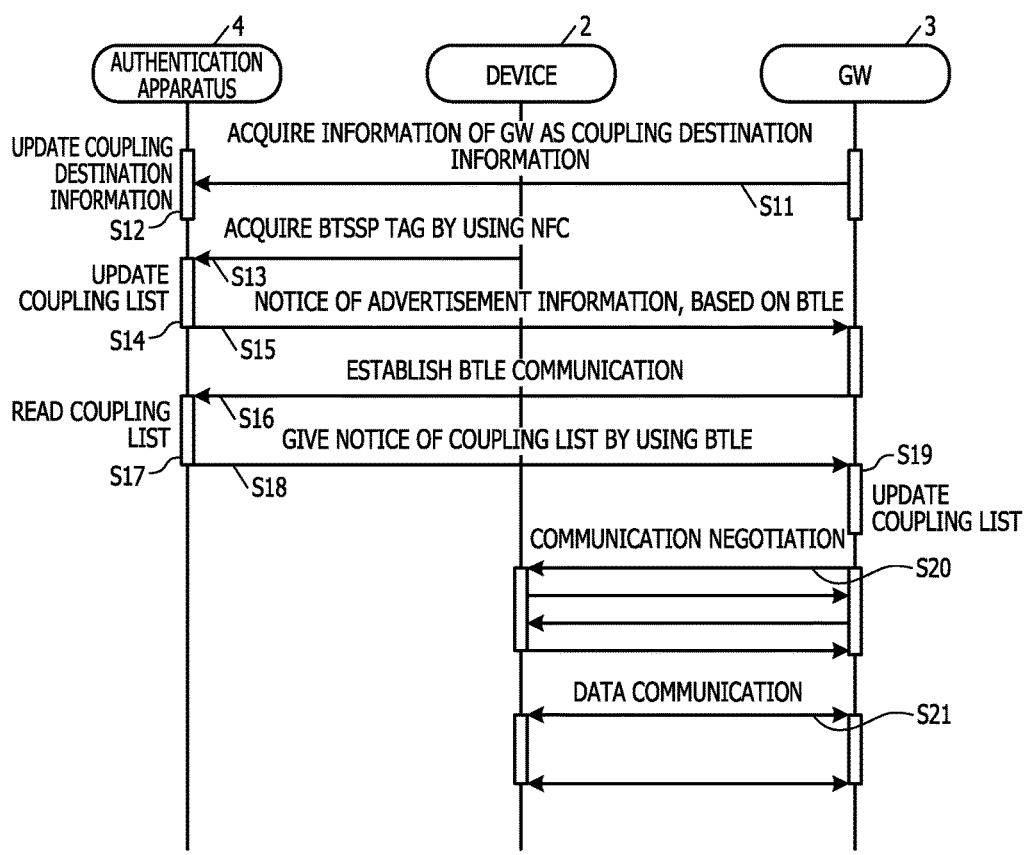
FIG. 10 is a sequence diagram illustrating an example of a processing operation of the device communication system relating to the communication establishment processing.

FIG. 10 is a sequence diagram illustrating an example of a processing operation of the device communication system 1 relating to the communication establishment processing. It is assumed that communication between the authentication apparatus 4 and the corresponding device 2 is the NFC communication, communication between the authentication apparatus 4 and the GW 3 is the BTLE communication, and communication between the corresponding device 2 and the GW 3 is the BT communication.

The second acquisition unit 52 within the authentication apparatus 4 acquires the coupling destination information from the GW 3 via the NFC reader 46 (step S11). The management unit 53 within the authentication apparatus 4 updates the coupling destination table 62 with the acquired coupling destination information (step S12). Note that a work for acquiring the coupling destination information only has to be performed once as long as the GW 3 serving as a coupling destination is not changed. The first acquisition unit 51 within the authentication apparatus 4 acquires, as the device information, the BTSSP tag from the device 2 serving as an addition target via the NFC reader 46 (step S13). The management unit 53 within the authentication apparatus 4 adds the acquired device information to the coupling list and updates the device table 61 with the added coupling list (step S14). Note that while being exemplified as a timing prior to acquisition of the BTSSP tag of the corresponding device 2, a timing at which the coupling destination information is acquired may be a timing subsequent to the acquisition of the BTSSP tag.

In a case where the coupling destination information exists within the coupling destination table 62 or in a case of acquiring the coupling destination information from the GW 3, the authentication apparatus 4 announces advertisement information by using the BTLE communication (step S15). As a result, based on the advertisement information, the GW 3 serving as a coupling destination recognizes the existence of the device 2 serving as an addition target. Note that, in a case where the coupling destination information does not exist within the coupling destination table 62, the authentication apparatus 4 does not perform processing operations in and after the step S15 until acquiring the coupling destination information from the GW 3 serving as a coupling destination.

In a case of receiving the advertisement information from the authentication apparatus 4, the GW 3 requests to establish BTLE communication with the authentication apparatus 4 (step S16). As a result, the GW 3 establishes BTLE communication with the authentication apparatus 4. Furthermore, the provision unit 54 within the authentication apparatus 4 reads the coupling list from within the device table 61 (step S17) and notifies the GW 3 serving as a coupling destination during communication of the coupling list (step S18). The GW 3 serving as a coupling destination updates the coupling table 29A with the received coupling list (step S19).

The GW 3 serving as a coupling destination references the coupling list and initiates, using the BT communication, a communication negotiation with one of the devices 2 in the coupling list, the device 2 serving as an addition target (step S20). And then, the GW 3 serving as a coupling destination establishes data communication, based on the BT communication, with the device 2 serving as an addition target (step S21). Note that the GW 3 performs communication not only with the device 2 serving as an addition target but also with all the devices 2 in the coupling list.

The authentication apparatus 4 illustrated in FIG. 10 acquires the device information from the device 2 serving as an addition target via the NFC reader 46, thereby updating the coupling list with the device information of the addition target to be added, and sets the updated coupling list in the GW 3 serving as a coupling destination. As a result, a user is able to reduce a work burden at the time of setting, in the GW 3 serving as a coupling destination, the coupling list to which the device information of the device 2 serving as an addition target is added.

The GW 3 serving as a coupling destination references the set coupling list and establishes data communication with each of the devices 2 in the coupling list. As a result, each of the devices 2 is able to perform, with low power, communication with the server 5 on the Internet via the GW 3.

Figure 11:
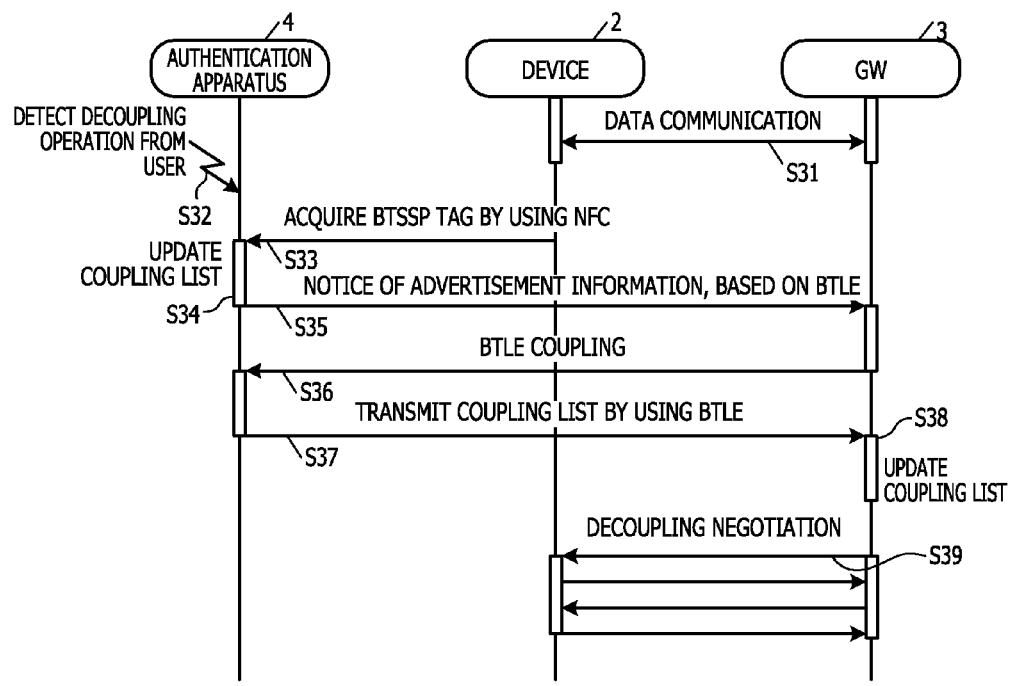
FIG. 11 is a sequence diagram illustrating an example of a processing operation of the device communication system relating to decoupling processing.

Next, decoupling processing for decoupling data communication between the corresponding device 2 and the GW 3 will be described. FIG. 11 is a sequence diagram illustrating an example of a processing operation of the device communication system 1 relating to the decoupling processing. During communication between the corresponding device 2 and the GW 3 (step S31), the authentication apparatus 4 illustrated in FIG. 11 detects a button operation of the button 49, for example, an operation of a decoupling instruction (step S32). Note that the operation of the decoupling instruction is not limited to the button operation of the button 49. The first acquisition unit 51 within the authentication apparatus 4 acquires, as the device information, the BTSSP tag of the device 2 serving as a decoupling target via the NFC reader 46 (step S33). Note that the device 2 serving as a decoupling target corresponds to the device 2 of the BTSSP tag acquired via the NFC reader 46 after the detection of the operation of the decoupling instruction.

In a case of acquiring the BTSSP tag of the device 2 serving as a decoupling target, the management unit 53 within the authentication apparatus 4 deletes the device information of the device 2 serving as a decoupling target from the coupling list, thereby updating the coupling list within the device table 61 (step S34). After updating the coupling list, the authentication apparatus 4 announces advertisement information based on the BTLE communication (step S35). As a result, in a case of receiving the advertisement information from the authentication apparatus 4, each of the GWs 3 serving as coupling destinations recognizes modification of the coupling list, caused by deleting the device information of the device 2 serving as a decoupling target from the coupling list.

After receiving the advertisement information, the GW 3 serving as a coupling destination requests to establish BTLE communication with the authentication apparatus 4 (step S36). The GW 3 establishes BTLE communication with the authentication apparatus 4. The provision unit 54 within the authentication apparatus 4 notifies the GW 3 serving as a coupling destination of the coupling list by using the BTLE communication (step S37). In a case of receiving the coupling list, the GW 3 serving as a coupling destination updates the coupling table 29A with the received coupling list (step S38). In addition, based on the updated coupling list, the GW 3 serving as a coupling destination initiates a decoupling negotiation with the device 2A serving as a decoupling target and decouples data communication with the device 2 serving as a decoupling target (step S39).

After detecting the decoupling operation, the authentication apparatus 4 illustrated in FIG. 11 acquires the device information from the device 2 serving as a decoupling target via the NFC reader 46 and performs updating by deleting the device information of the decoupling target from the coupling list. In addition, the authentication apparatus 4 illustrated in FIG. 11 sets the updated coupling list in the GW 3 serving as a coupling destination. As a result, since specifying the device 2 serving as a decoupling target by using the NFC reader 46, a user is able to reduce a work burden at the time of specifying the device 2 serving as a decoupling target.

The GW 3 references the coupling list and decouples communication with the device 2 serving as a decoupling target. As a result, the GW 3 serving as a coupling destination is able to decouple communication with the device 2 serving as a decoupling target.

Figure 12:
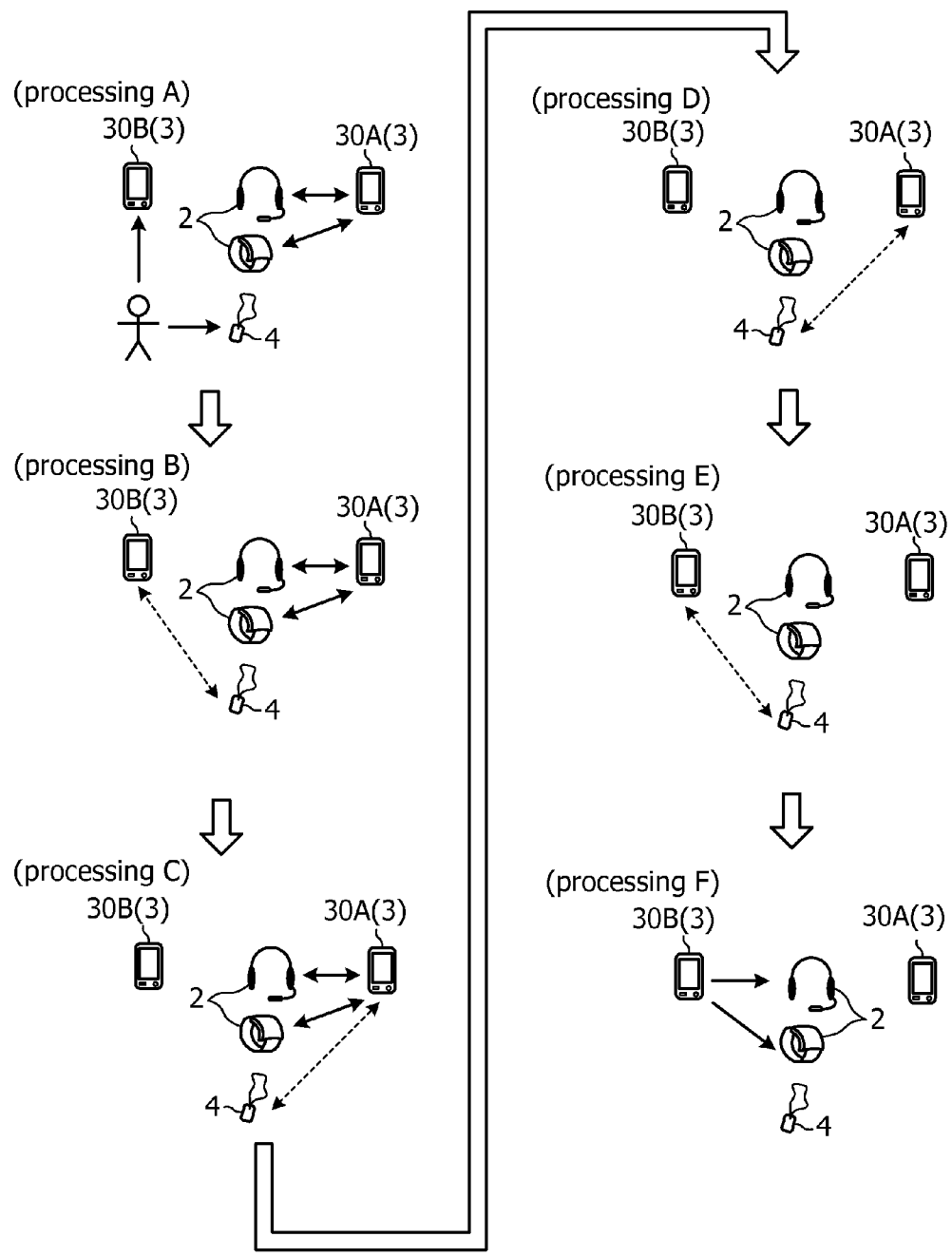
FIG. 12 is an explanatory diagram illustrating an example of an operation of GW changing processing relating to the device communication system.

Next, an operation of GW changing processing for changing, to a new GW 3, the GW 3 serving as a coupling destination of the corresponding device 2 within the device communication system 1 will be described. FIG. 12 is an explanatory diagram illustrating an example of a processing operation of the entire device communication system 1 relating to the GW changing processing. Note that, for convenience of explanation, for example, it is assumed that a first GW 30A is the GW 3 serving as a coupling destination that is performing communication with the corresponding devices 2 and a second GW 30B is the new GW 3.

In processing A in FIG. 12, a user brings the authentication apparatus 4 close to the new second GW 30B. In processing B in FIG. 12, the NFC reader 46 in the authentication apparatus 4 acquires coupling destination information from an NFC tag within the second GW 30B. In addition, the authentication apparatus 4 temporarily stores therein the coupling destination information of the second GW 30B. In processing C in FIG. 12, the authentication apparatus 4 instructs the first GW 30A to decouple communication between the devices 2 corresponding to the coupling list and the first GW 30A.

In processing D in FIG. 12, in response to the decoupling instruction from the authentication apparatus 4, the first GW 30A decouples communication with the corresponding devices 2 and notifies the authentication apparatus 4 of decoupling completion. In a case of receiving the decoupling completion from the first GW 30A, the authentication apparatus 4 rewrites the coupling destination information from the first GW 30A to the second GW 30B, thereby performing updating, in processing E in FIG. 12. In addition, the authentication apparatus 4 notifies the second GW 30B of a coupling list. The second GW 30B references the coupling list from the authentication apparatus 4 and establishes BT communication with the corresponding devices 2 in processing F in FIG. 12. As a result, it is possible to change the coupling destination information of the corresponding devices 2 from the first GW 30A to the second GW 30B.

Figure 13:
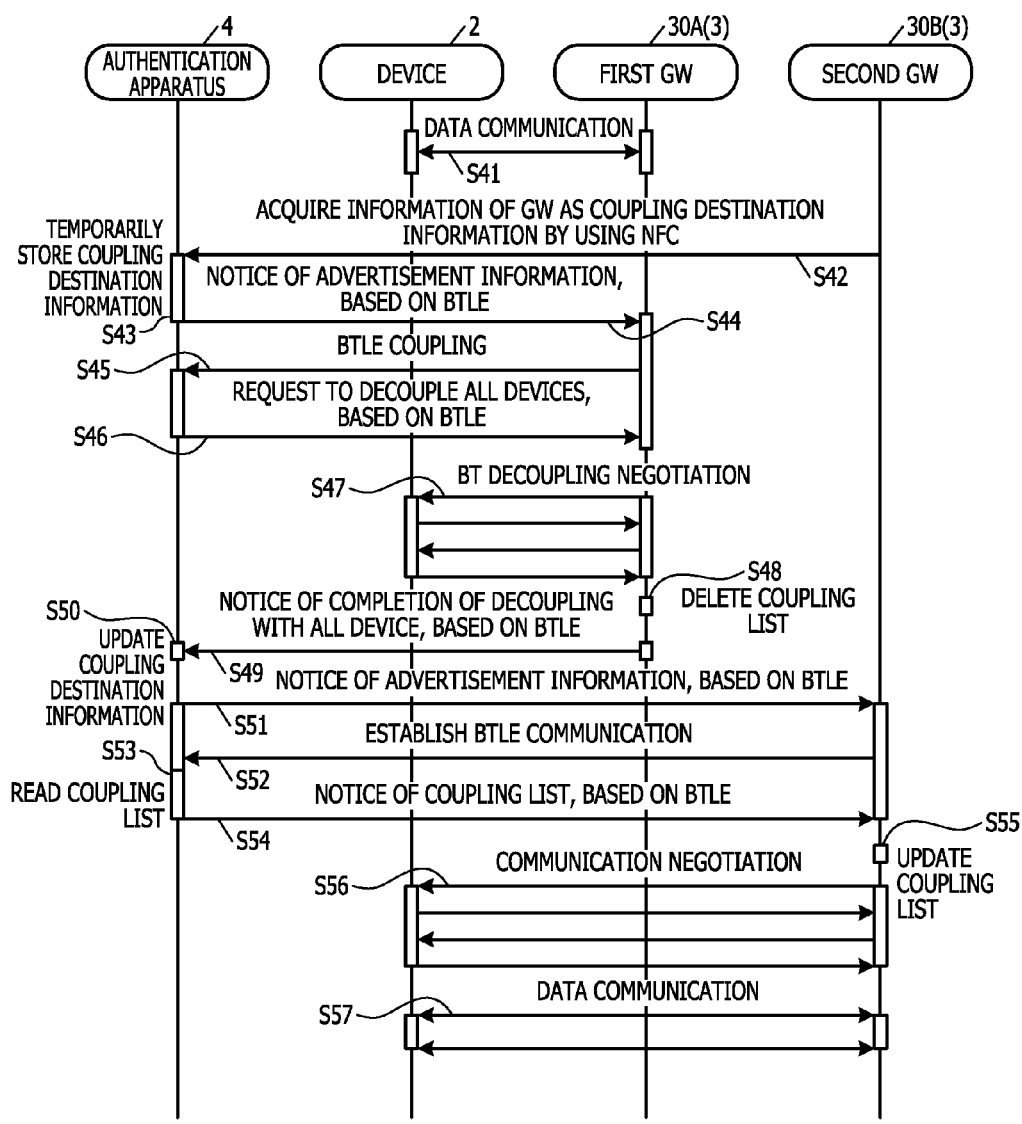
FIG. 13 is a sequence diagram illustrating an example of a processing operation of the device communication system relating to the GW changing processing.

FIG. 13 is a sequence diagram illustrating an example of a processing operation of the device communication system 1 relating to the GW changing processing. During communication between the first GW 30A and the corresponding device 2 (step S41), the second acquisition unit 52 within the authentication apparatus 4 illustrated in FIG. 13 acquires the coupling destination information of the new second GW 30B via the NFC reader 46 (step S42). Note that the authentication apparatus 4 temporarily stores the coupling destination information of the new second GW 30B in the coupling destination table 62 (step S43).

In a case of temporarily storing the coupling destination information of the new second GW 30B, the authentication apparatus 4 announces advertisement information by using the BTLE communication (step S44). Note that the advertisement information is information relating to change of the GW 3 serving as a coupling destination. The first GW 30A receives the advertisement information and recognizes GW changing. In a case of receiving the advertisement information, the first GW 30A requests to establish BTLE communication with the authentication apparatus 4 (step S45). The first GW 30A establishes BTLE communication with the authentication apparatus 4. In addition, the provision unit 54 within the authentication apparatus 4 notifies the first GW 30A of a request to decouple all the devices 2 (step S46).

In a case of detecting the decoupling request, the first GW 30A initiates a decoupling negotiation for BT communication with the device 2 during communication and decouples communication with the corresponding device 2 (step S47). After decoupling communication with all the devices 2, the first GW 30A deletes the coupling list (step S48).

After deleting the coupling list, the first GW 30A notifies the authentication apparatus 4 of a decoupling completion notice indicating completion of decoupling with all the devices 2 (step S49). In a case of receiving the decoupling completion notice from the first GW 30A, the management unit 53 within the authentication apparatus 4 updates the coupling destination table 62 with the temporarily stored coupling destination information of the second GW 30B (step S50).

In response to updating of the coupling destination information, the authentication apparatus 4 announces advertisement information based on the BTLE communication (step S51). Note that the advertisement information is announcement information for notifying surrounding GWs 3 of the updating of the coupling destination information. The second GW 30B recognizes the updating of the coupling destination information and requests to establish BTLE communication with the authentication apparatus 4 (step S52). The second GW 30B establishes BTLE communication with the authentication apparatus 4. The provision unit 54 within the authentication apparatus 4 reads the coupling list (step S53) and notifies the second GW 30B of the read coupling list by using the BTLE communication (step S54).

The management unit 53 within the second GW 30B updates the coupling list received from the authentication apparatus 4 (step S55) and references the coupling list, thereby initiating a communication negotiation for BT communication with each of the devices 2 (step S56). The second GW 30B establishes data communication with each of the devices 2 in the coupling list by using the BT communication (step S57).

Upon acquiring the coupling destination information of the new second GW 30B via the NFC reader 46 during communication between the first GW 30A and the corresponding device 2, the authentication apparatus 4 illustrated in FIG. 13 decouples communication between the first GW 30A and the corresponding device 2. In addition, the authentication apparatus 4 sets a coupling list within the new second GW 30B, and the second GW 30B performs communication with each of the devices 2 in the coupling list. As a result, a user is able to easily change the coupling destination of the corresponding device 2 from the first GW 30A to the second GW 30B.

The authentication apparatus 4 of the first example acquires the device information from the corresponding device 2 and sets, in the GW 3, the coupling list to which the device information is added, thereby causing communication between the corresponding device 2 and the GW 3 to be established based on the set coupling list. As a result, a user is able to reduce a work burden at the time of setting the coupling list in the GW 3.

The authentication apparatus 4 acquires the device information from the corresponding device 2 by using the NFC communication. As a result, a user is able to easily acquire the device information only by bringing the authentication apparatus 4 and the corresponding device 2 close to each other.

The authentication apparatus 4 manages the coupling list of the corresponding device 2 and sets the coupling list in the GW 3 serving as a coupling destination. As a result, even in a case where the number of the devices 2 coupled to the GW 3 increases, it is possible for a user to easily set the device information of the corresponding device 2 in the GW 3. Furthermore, a user does not have to operate the GW 3 at the time of coupling of the corresponding device 2 and is able to switch the GW 3 serving as a coupling destination of the corresponding device 2 even though remaining putting the GW 3 in a bag.

Furthermore, the authentication apparatus 4 is able to collectively manage the coupling list of the corresponding device 2 and the coupling destination information of the corresponding GW 3. It is easy to control communication between the devices 2 and the GWs 3.

Furthermore, in a case of changing, to a new GW 3, the coupling destination of the device 2 serving as a changing target of the GW 3 serving as a coupling destination, the authentication apparatus 4 adds, to the coupling list, the device information of the device 2 serving as a changing target and sets the coupling list in the new GW 3. As a result, a user is able to easily set, in the GW 3, the device information of the device 2 serving as a changing target.

Furthermore, even in a case of a change in the GW 3 serving as a coupling destination, the authentication apparatus 4 sets, in each of the devices 2 in the coupling list, the coupling destination information of the changed GW 3 serving as a coupling destination. As a result, even in a case of a change in the GW 3 serving as a coupling destination, a user is able to set, in each of the devices 2 in the coupling list, the coupling destination information indicating the changed GW 3 serving as a coupling destination.

An instruction issued to the authentication apparatus 4 to exclude a device only has to be able to be discriminated from an operation of device coupling or device decoupling. In a case of acquiring the BTSSP tag of the relevant coupled device during or after instructing to exclude the relevant device, the device information of the acquired BTSSP tag is deleted from the coupling list. It is assumed that, at this time, an instruction relating to decoupling of communication is not transmitted from the authentication apparatus 4 to the GW 3. It is possible to exclude the relevant device 2 from the coupling list of the authentication apparatus 4 while continuing communication between the relevant device 2 and the GW 3.

In addition, the authentication apparatus 4 acquires the device information from the device 2 serving as a decoupling target via the NFC reader 46. However, the authentication apparatus 4 may provide a display function of displaying the coupling list within the device table 61 and may specify and delete, from the currently displayed coupling list, the device information of the device 2 serving as a decoupling target. In addition, since holding the coupling list of a communication target, the GW 3 serving as a coupling destination may display the coupling list on the LCD 25 and may specify and delete, from the currently displayed coupling list, the device information of the device 2 serving as a decoupling target.

After detecting an operation for excluding the corresponding device 2, the authentication apparatus 4 acquires, as the device information, the BTSSP tag of the device 2 serving as an exclusion target via the NFC reader 46 and deletes the device information of the device 2 serving as an exclusion target from the coupling list, thereby updating the coupling list. As a result, the authentication apparatus 4 is able to delete the device information of the device 2 serving as an exclusion target from the registered device information. Note that the authentication apparatus 4 not only may delete the device information of the devices 2 serving as exclusion targets from the registered device information in units of devices but also may collectively delete the device information of the devices 2 serving as exclusion targets in units of groups described later.

Note that while, in the above-mentioned first example, the smartphone is exemplified as the GW 3, the GW 3 is not limited to the smartphone and only has to be a communication apparatus with a built-in communication function. The GW 3 may be, for example, a tablet terminal, a personal computer, a router, or the like, equipped with a wireless LAN, the BT, and the BTLE. In addition, used wireless communication technologies are not limited to the BTLE, the BT, and the NFC, and, for example, optical reading based on a bar code, infrared ray, ultrasonic waves, a voice signal, the IEEE802.15.4 standard, a Wi-Fi standard, a BT standard, or the like may be used.

In the device communication system 1 of the above-mentioned first example, the authentication apparatus 4 sets the coupling list of the corresponding device 2 in the GW 3 serving as a coupling destination, and the GW 3 serving as a coupling destination instructs the corresponding device 2 to perform communication. However, the corresponding device 2 may initiate a communication negotiation with the GW 3 serving as a coupling destination. An embodiment in this case will be described as a second example hereinafter.

Second Example

A device communication system 1A of the second example is different from the device communication system 1 of the first example in that each of the devices 2 instructs the GW 3 serving as a coupling destination to perform communication or the like. Note that the same symbol is assigned to the same configuration as that of the device communication system 1 of the first example, thereby omitting the redundant descriptions of the configuration and operation thereof.

An authentication apparatus 4A notifies each of devices 2A in a coupling list of coupling destination information stored in the coupling destination table 62. In a case of receiving the coupling destination information, each of the devices 2A stores therein the coupling destination information. Based on the coupling destination information, each of the devices 2A initiates a communication negotiation for BTLE communication with a GW 3A serving as a coupling destination of the relevant device 2A itself.

After detection of an operation of a decoupling instruction, the first acquisition unit 51 within the authentication apparatus 4A acquires the device information of the device 2A serving as a decoupling target via the NFC reader 46. The management unit 53 within the authentication apparatus 4A deletes the device information of the device 2A serving as a decoupling target from the coupling list, thereby updating the device table 61. The authentication apparatus 4A instructs the device 2A serving as a decoupling target to perform communication decoupling. In addition, in a case of receiving the instruction for the communication decoupling from the authentication apparatus 4A, the device 2A serving as a decoupling target initiates a decoupling negotiation for BTLE communication with the GW 3A.

Figure 14:
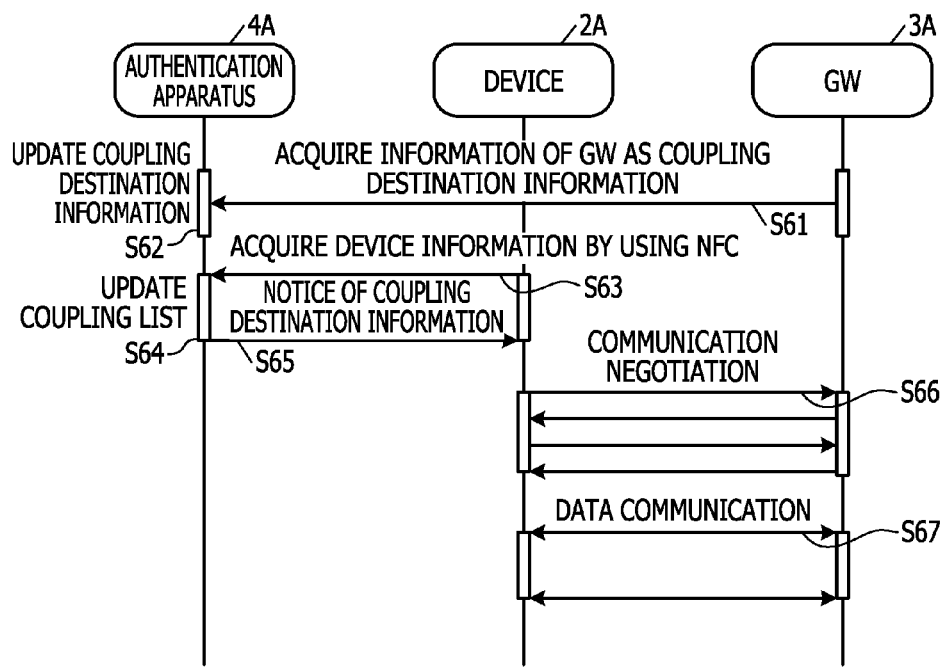
FIG. 14 is a sequence diagram illustrating an example of a processing operation relating to communication establishment processing in a device communication system of a second example.

Next, an operation of the device communication system 1A of the second example will be described. FIG. 14 is a sequence diagram illustrating an example of a processing operation relating to communication establishment processing in the device communication system 1A of the second example. The second acquisition unit 52 within the authentication apparatus 4A illustrated in FIG. 14 acquires coupling destination information from the GW 3A serving as a coupling destination via the NFC reader 46 (step S61). The management unit 53 within the authentication apparatus 4A updates the coupling destination table 62 with the acquired coupling destination information (step S62). The first acquisition unit 51 within the authentication apparatus 4 acquires, as the device information, a BTSSP tag from the device 2A serving as an addition target via the NFC reader 46 (step S63).

In a case of receiving the device information from the device 2A serving as an addition target, the authentication apparatus 4A updates the device table 61 with the coupling list to which the device information of the device 2A serving as an addition target is added (step S64). After updating the coupling list, the authentication apparatus 4A references the coupling list and notifies each of the devices 2A in the coupling list of the coupling destination information for identifying the GW 3A serving as a coupling destination (step S65). Each of the devices 2A references the coupling destination information and initiates a communication negotiation with the GW 3A serving as a coupling destination (step S66). Each of the devices 2A establishes data communication with the GW 3A serving as a coupling destination (step S67) and terminates the processing operation illustrated in FIG. 14. As a result, the devices 2A are able to perform communication with, for example, the server 5 via the GW 3A serving as a coupling destination.

The authentication apparatus 4A illustrated in FIG. 14 acquires the device information of the device 2A serving as an addition target via the NFC reader 46 and updates the coupling list including the device information. The authentication apparatus 4A references the updated coupling list and notifies each of the devices 2A in the coupling list of the coupling destination information. Based on the coupling destination information, each of the devices 2A initiates a communication negotiation with the GW 3A serving as a coupling destination. As a result, a user is able to reduce a work burden of setting the coupling destination information for each of the devices 2A.

Figure 15:
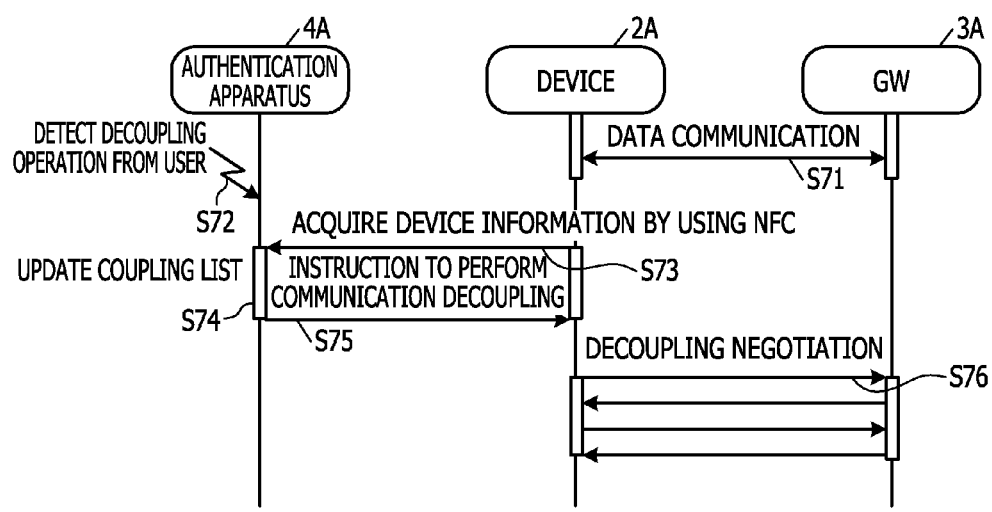
FIG. 15 is a sequence diagram illustrating an example of a processing operation relating to decoupling processing in the device communication system of the second example.

FIG. 15 is a sequence diagram illustrating an example of a processing operation relating to decoupling processing in the device communication system 1A of the second example. During communication between the corresponding device 2A and the GW 3A (step S71), the first acquisition unit 51 within the authentication apparatus 4A illustrated in FIG. 15 detects an instruction operation of communication decoupling (step S72). The first acquisition unit 51 acquires device information from the device 2A serving as a decoupling target via the NFC reader 46 (step S73). The management unit 53 within the authentication apparatus 4A deletes the acquired device information of the decoupling target from the coupling list, thereby updating the coupling list within the device table 61 (step S74). After updating the coupling list, the authentication apparatus 4A instructs the device 2A serving as a decoupling target to perform communication decoupling (step S75). In a case of receiving the communication decoupling, the corresponding device 2A initiates a decoupling negotiation with the GW 3A serving as a coupling destination (step S76).

The authentication apparatus 4A illustrated in FIG. 15 acquires the device information of the device 2A serving as a decoupling target via the NFC reader 46 and performs updating by deleting the device information of the decoupling target from the coupling list. The authentication apparatus 4A references the coupling list and notifies each of the devices 2A in the coupling list of the coupling destination information. Based on the coupling destination information, the device 2A serving as a decoupling target initiates a decoupling negotiation with the GW 3A serving as a coupling destination and decouples data communication. As a result, a user is able to reduce a work burden at the time of specifying the device 2A serving as a decoupling target.

Figure 16:
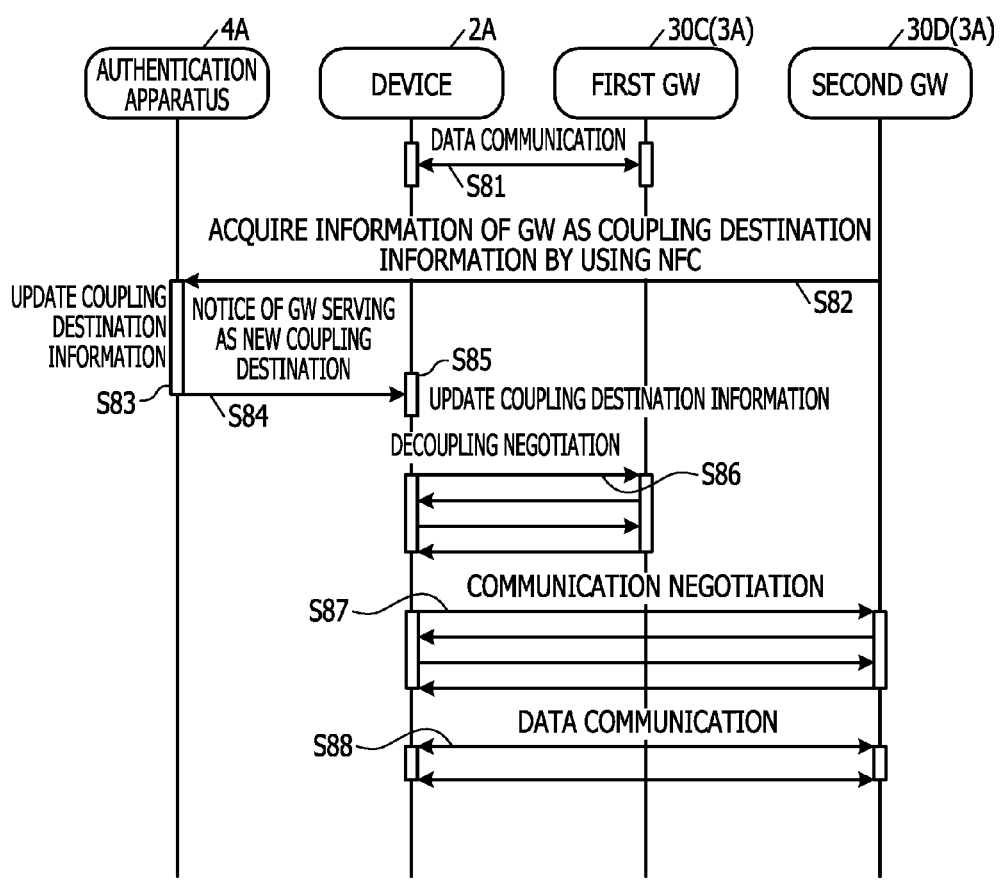
FIG. 16 is a sequence diagram illustrating an example of a processing operation relating to GW changing processing in the device communication system of the second example.

FIG. 16 is a sequence diagram illustrating an example of a processing operation relating to GW changing processing in the device communication system 1A of the second example. Note that it is assumed that a GW 3A, which currently performs communication, is a first GW 30C and a new GW 3A is a second GW 30D. During communication between the corresponding device 2A and the first GW 30C (step S81), the second acquisition unit 52 within the authentication apparatus 4A illustrated in FIG. 16 acquires new coupling destination information from information of the new second GW 30D via the NFC reader 46 (step S82).

The management unit 53 within the authentication apparatus 4A updates the coupling destination table 62 with the acquired coupling destination information of the new second GW 30D (step S83). After updating the coupling destination information, the authentication apparatus 4A references the coupling list and notifies each of the devices 2A in the coupling list of the new coupling destination information (step S84). In a case of receiving the new coupling destination information, each of the devices 2A updates new coupling destination information (step S85) and initiates a decoupling negotiation with the first GW 30C that currently performs communication (step S86). As a result, each of the devices 2A decouples communication with the first GW 30C that currently performs communication, thereby decoupling communication with the server 5.

Each of the devices 2A references the new coupling destination information, initiates a communication negotiation with the second GW 30D (step S87), and establishes communication with the second GW 30D, thereby initiating communication with the server 5. Each of the devices 2A establishes data communication with the second GW 30D (step S88) and terminates the processing operation illustrated in FIG. 16. As a result, the devices 2A perform data communication with the server 5 via the second GW 30D.

During communication between the corresponding device 2A and the first GW 30C, the authentication apparatus 4A illustrated in FIG. 16 acquires the coupling destination information of the new second GW 30D via the NFC reader 46 and notifies each of the devices 2A of the coupling destination information of the second GW 30D. Each of the devices 2A switches from the coupling destination information of the first GW 30C to the coupling destination information of the second GW 30D and initiates communication with the second GW 30D. As a result, a user is able to reduce a work burden at the time of switching the GW 3A.

The authentication apparatus 4A of the second example acquires the coupling destination information from the corresponding GW 3A and sets the coupling destination information in the corresponding device 2A, thereby establishing communication between the corresponding device 2A and the corresponding GW 3A, based on the set coupling destination information. As a result, a user is able to reduce a work burden at the time of setting the coupling destination information in the corresponding device 2A.

The authentication apparatus 4A acquires the coupling destination information from the corresponding GW 3A by using the NFC communication. As a result, a user is able to easily acquire the coupling destination information only by bringing the authentication apparatus 4A and the corresponding GW 3A close to each other.

Note that while, in the above-mentioned first example, the devices 2 and the GWs 3 serving as coupling destinations are managed while being associated with each other, the devices 2 may be classified into groups and the GWs 3 serving as coupling destinations may be managed in units of groups. An embodiment in this case will be described as a third example.

Third Example

In a device communication system 1B of the third example, devices 2B are classified into groups, a first device 2B out of the devices 2B is classified as, for example, a first group, and a second device 2B out of the devices 2B is classified as, for example, a second group. Note that the same symbol is assigned to the same configuration as that of the device communication system 1 of the first example, thereby omitting the redundant descriptions of the configuration and operation thereof.

Figure 17:
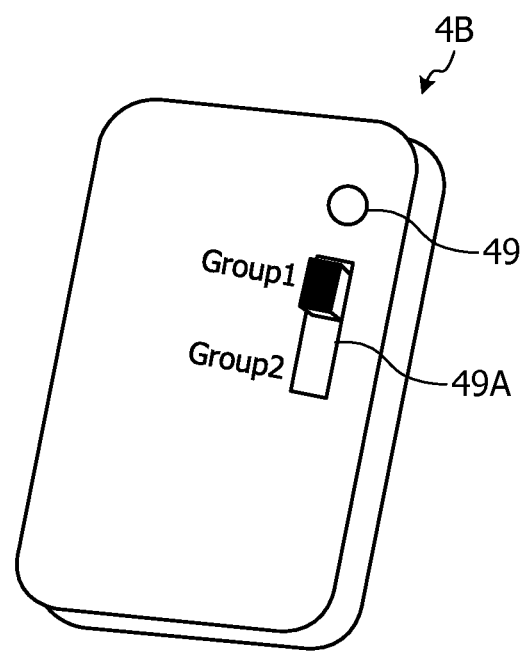
FIG. 17 is a block diagram illustrating an example of an external configuration of an authentication apparatus relating to a device communication system of a third example.

FIG. 17 is an explanatory diagram illustrating an example of an external configuration of an authentication apparatus 4B of the third example. In addition to the button 49 for instructing to decouple or exclude, the authentication apparatus 4B illustrated in FIG. 17 includes a switch 49A for specifying so as to be able to switch to the first group or the second group, to which the corresponding device 2B belongs.

FIG. 18 is an explanatory diagram illustrating an example of a coupling list of the third example. In the coupling list illustrated in FIG. 18, in addition to the device name 61A, the MAC address 61B, and the device function name 61C, a group ID 61D is managed while being associated therewith. The group ID 61D is an ID for identifying a group to which the device 2B or the GW 3B belongs. The CPU 48 references the coupling list and is able to recognize, for example, a device function, "Gateway", of a device name, "X", and a device function, "HID", of a device name, "keyboard Z" within the first group, "1".

Figure 19:
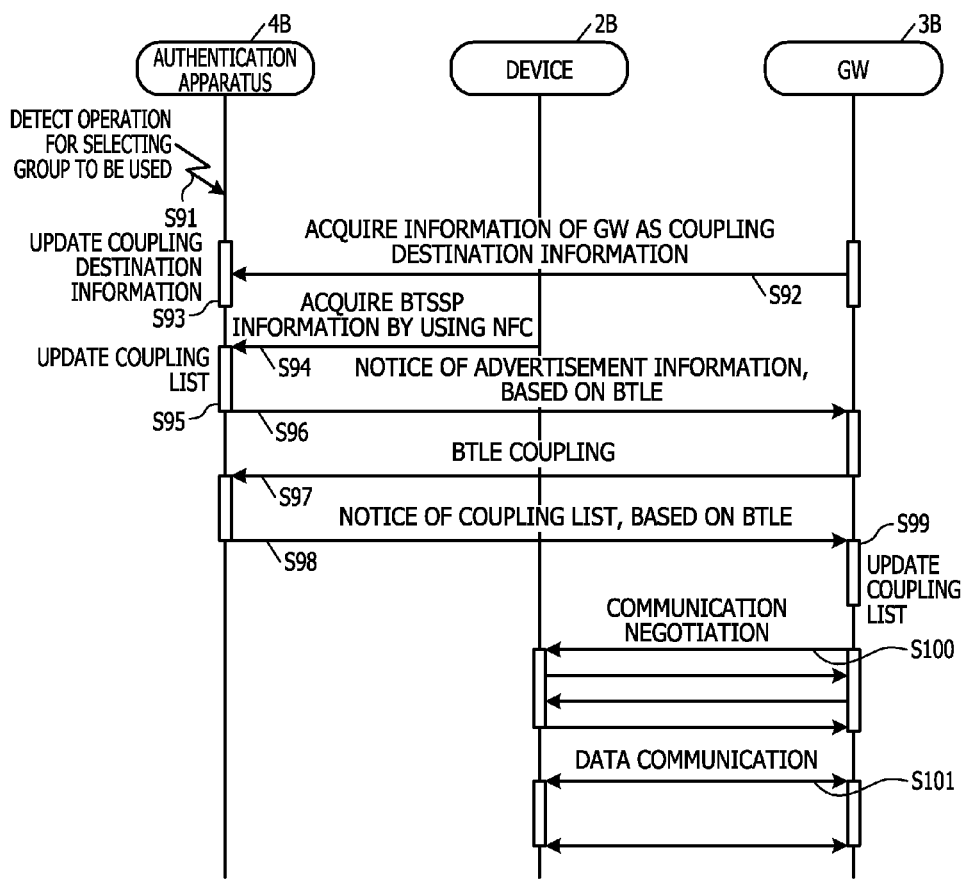
FIG. 19 is a sequence diagram illustrating an example of a processing operation of communication establishment processing relating to the device communication system of the third example.

FIG. 19 is a sequence diagram illustrating an example of a processing operation relating to communication establishment processing in the device communication system 1B of the third example. Upon detecting a group specification operation of the switch 49A (step S91), the authentication apparatus 4B illustrated in FIG. 19 acquires coupling destination information from the GW 3B serving as a coupling destination via the NFC reader 46 (step S92).

The authentication apparatus 4B updates the coupling destination table 62 with the coupling destination information while associating the coupling destination information with a specified group (step S93). As a result, the authentication apparatus 4B is able to register the GW 3B that serves as a coupling destination and that corresponds to the specified group. Furthermore, from among the devices 2B serving as coupling destinations within the specified group, the authentication apparatus 4B registers, in the device table 61, a device whose device function is "Gateway", in other words, the GW 3B serving as a coupling destination.

The first acquisition unit 51 within the authentication apparatus 4B acquires, as device information, a BTSSP tag from the device 2B serving as an addition target via the NFC reader 46 (step S94). The management unit 53 within the authentication apparatus 4B adds the device information acquired from the device 2B serving as an addition target to a coupling list corresponding to the specified group, thereby updating the device table 61 (step S95). As a result, the authentication apparatus 4B is able to additionally register the device information of the addition target in the specified group.

The authentication apparatus 4B references the coupling destination information and announces advertisement information by using the BTLE communication (step S96). As a result, in a case of receiving the advertisement information, the GW 3B is able to recognize updating of the coupling list, caused by the addition of the device 2B serving as an addition target. The GW 3B serving as a coupling destination requests the authentication apparatus 4B to establish BTLE communication (step S97). The GW 3B serving as a coupling destination establishes BTLE communication with the authentication apparatus 4B. The provision unit 54 within the authentication apparatus 4B notifies the GW 3B, which serves as a coupling destination and corresponds to the specified group, of the coupling list (step S98).

The GW 3B serving as a coupling destination acquires the coupling list from the authentication apparatus 4B and updates the acquired coupling list (step S99). In addition, the GW 3B serving as a coupling destination references the updated coupling list, thereby initiating a communication negotiation with each of the devices 2B in the coupling list (step S100). The GW 3B serving as a coupling destination establishes data communication with the corresponding device 2B (step S101) and terminates the processing operation illustrated in FIG. 19.

After specifying a group, the authentication apparatus 4B illustrated in FIG. 19 acquires the coupling destination information of the new GW 3B via the NFC reader 46 and updates the coupling destination table 62 with the coupling destination information corresponding to the specified group. As a result, a user is able to reduce a work burden of setting the coupling destination information of the specified group. Note that the coupling destination information of each of the specified groups may be identical.

Furthermore, the authentication apparatus 4B acquires the device information of the device 2B serving as an addition target via the NFC reader 46 and updates the coupling list of the device information corresponding to the specified group. As a result, a user is able to reduce a work burden of setting the device information of the specified group.

Furthermore, the authentication apparatus 4B references the coupling destination information corresponding to the specified group and sets the coupling list of the specified group for the GW 3B of the coupling destination information. The GW 3B serving as a coupling destination in the specified group references the coupling list in the specified group and initiates a communication negotiation with each of the devices 2B in the coupling list. As a result, a user is able to reduce a work burden of setting, in the GW 3B serving as a coupling destination, the devices 2B within the specified groups in units of groups.

Next, an operation in a case of changing the device information of the device 2B within the first group to the second group will be described. Upon detecting an operation for specifying the second group to serve as a change destination, the authentication apparatus 4B acquires the device information from the device 2B serving as a change target via the NFC reader 46. After acquiring the device information of the device 2B serving as a change target, the authentication apparatus 4B determines whether or not the device information of the device 2B serving as a change target exists within the coupling list of the second group.

In a case where the device information of the device 2B serving as a change target does not exist within the coupling list of the second group, the authentication apparatus 4B deletes the device information of the device 2B serving as a change target from the first group, thereby updating the device table 61 with the coupling list. In response to the change of the coupling list, the authentication apparatus 4B gives notice of advertisement information based on the BTLE communication.

In a case of receiving the advertisement information, the GW 3B serving as a coupling destination within the first group establishes BTLE communication with the authentication apparatus 4B. In addition, the authentication apparatus 4B gives notice of the updated coupling list by using the BTLE communication. The GW 3B serving as a coupling destination in the first group receives the coupling list, references the received coupling list, recognizes deletion of the device 2B serving as a change target, and initiates a decoupling negotiation with the device 2B serving as a change target, thereby decoupling communication with the corresponding device 2B.

Furthermore, the authentication apparatus 4B announces advertisement information indicating the change of the coupling list. In a case of receiving the advertisement information that indicates the change of the coupling list and that is based on the BTLE communication, the GW 3B serving as a coupling destination within the second group references the coupling list and recognizes addition of the device 2B serving as a change target. The GW 3B serving as a coupling destination initiates a communication negotiation with the device 2B serving as a change target and establishes data communication with the corresponding device 2B.

In a case of changing the device information of the device 2B serving as a change target from the first group to the second group in a switching manner, the authentication apparatus 4B specifies a group serving as a change destination and acquires the device information of the device 2B serving as a change target via the NFC reader 46, thereby updating the coupling list. The authentication apparatus 4B notifies the GW 3B, which serves as a coupling destination and corresponds to the group serving as a change source, of the updated coupling list. The GW 3B corresponding to the group serving as a change source decouples communication with the device 2B serving as a change target, and the GW 3B corresponding to the group serving as a change destination references the coupling list of the group serving as a change destination and initiates communication with the device 2B serving as a change target. As a result, even in a case of moving the corresponding device 2B between the groups, a user is able to reduce a work burden at the time of setting the device information of the device 2B serving as a change target.

The authentication apparatus 4B specifies a target group, acquires the device information from the device 2B serving as a decoupling target via the NFC reader 46 after detecting a decoupling operation, and deletes the device 2B serving as a decoupling target from the coupling list, thereby updating the coupling list. Furthermore, the authentication apparatus 4B announces advertisement information of changing the coupling list. As a result, the authentication apparatus 4B is able to delete the device 2B serving as a decoupling target from a group during communication. Note that the authentication apparatus 4B not only may perform, within the registered devices 2B, communication decoupling on the devices 2B serving as decoupling targets in units of devices but also may perform communication decoupling in units of groups.

In this case, after detecting an operation for specifying a group serving as a decoupling target, the authentication apparatus 4B deletes the coupling list within the group serving as a decoupling target, thereby updating the coupling list, and announces advertisement information of changing the coupling list. As a result, the authentication apparatus 4B is able to collectively perform communication decoupling on the device information of all the devices 2B in the coupling list within the group serving as a decoupling target.

The authentication apparatus 4B references the coupling list and instructs the GW 3B, which serves as a coupling destination and corresponds to the first group, to cancel coupling with the device 2B belonging to the first group. Upon detecting cancellation of coupling, the GW 3B corresponding to the first group cancels coupling with the device 2B belonging to the first group and notifies the authentication apparatus 4B of completion of cancellation of coupling with the corresponding device 2B.

In a case of receiving the completion of cancellation of coupling, the authentication apparatus 4B updates the coupling destination table 62 with the coupling destination information of the new GW 3B and notifies the new GW 3 of the coupling list of the first group. The new GW 3B references the coupling list within the first group and initiates a communication negotiation with each of the devices 2B in the coupling list.

The authentication apparatus 4B enables groups to be integrated with one another, and after detecting a specialized operation for integrating the second group with, for example, the first group, the authentication apparatus 4B instructs the GW 3B, which serves as a coupling destination and corresponds to the second group, to cancel coupling with each of the devices 2B in the coupling list relating to the second group. Upon detecting the instruction to cancel coupling with the devices 2B within the second group, the GW 3B corresponding to the second group completes cancellation of coupling with the devices 2B and notifies the authentication apparatus 4B of the completion of cancellation of coupling. In a case of receiving the completion of cancellation of coupling of the second group, the authentication apparatus 4B adds the coupling list of the second group to the coupling list of the first group and registers the coupling list of the second group in the device table 61, thereby updating the device table 61.

In addition, the authentication apparatus 4B sets the coupling list of the first group in the GW 3B of the coupling destination information corresponding to the first group. The GW 3B corresponding to the first group references the coupling list within the first group and initiates a communication negotiation with each of the devices 2B in the coupling list. As a result, the authentication apparatus 4B is able to integrate the coupling list within the second group into the coupling list within the first group with a simple operation.

For each of the groups, the authentication apparatus 4B of the third example manages the coupling list to which the device information of the device 2B belonging to the relevant group is added and the coupling destination information of the GW 3B belonging to the relevant group. Furthermore, the authentication apparatus 4B sets, in the GW 3B belonging to a specified group, the coupling list of the device 2B belonging to the relevant group. As a result, a user is able to reduce a work burden of setting the coupling list of the specified group in the GW 3B.

Note that while the authentication apparatus 4B of the above-mentioned third example classifies the devices 2B into the two groups, the number of the groups is not limited to two.

In addition, individual component elements in each of units illustrated in drawings do not have to be physically configured as illustrated in drawings. In other words, a specific example of the distribution or integration of the individual units is not limited to one of examples illustrated in drawings, and the individual units may be configured by functionally or physically distributing or integrating all or part of the individual units in arbitrary units according to various loads, various statuses of use, and so forth.

Furthermore, all or arbitrary part of various kinds of processing functions performed in each of apparatuses may be performed on a microcomputer such as a CPU, a micro processing unit (MPU), or a micro controller unit (MCU)). In addition, it goes without saying that all or arbitrary part of various kinds of processing functions may be performed on a program analyzed and performed in a microcomputer such as a CPU, an MPU, or a MCU or may be performed on hardware based on hard-wired logic.

Figure 20:
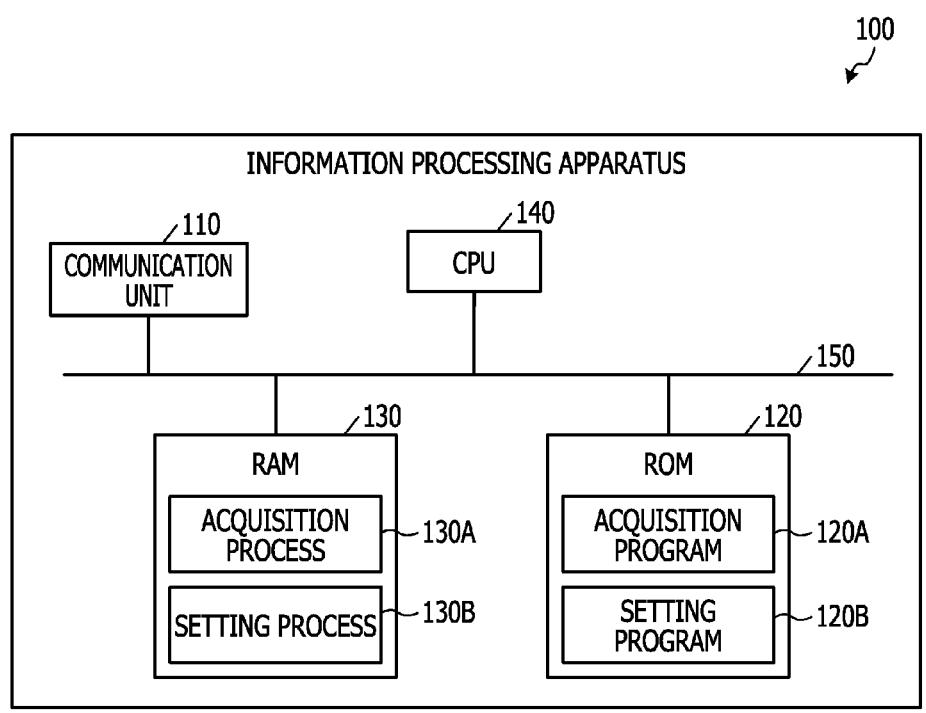
FIG. 20 is an explanatory diagram illustrating an example of an information processing apparatus that executes a communication management program.

By the way, various kinds of processing described in the present example may be realized by causing a CPU within an information processing apparatus to execute a preliminarily prepared program. Therefore, in what follows, an example of an information processing apparatus that executes a program having the same functions as those of the above-mentioned examples will be described. FIG. 20 is an explanatory diagram illustrating an example of an information processing apparatus that executes a communication management program.

An information processing apparatus 100, which executes the communication management program and is illustrated in FIG. 20, includes a communication unit 110, a ROM 120, a RAM 130, and a CPU 140. The communication unit 110, the ROM 120, the RAM 13, and the CPU 140 are coupled to one another via a bus 150. The communication unit 110 is a communication interface that performs communication with the first terminal and the second terminal, not illustrated.

In addition, in the ROM 120, the communication management program that achieves the same functions as those of the above-mentioned examples is preliminarily stored. In the ROM 120, as the communication management program, an acquisition program 120A and a setting program 120B are stored. Note that the communication management program may be stored not in the ROM 120 but in a recording medium readable by a computer by using a drive. In addition, the recording medium may be, for example, a portable recording medium such as a CD-ROM, a DVD disc, or a USB memory, a semiconductor memory such as a flash memory, or the like.

In addition, the CPU 140 reads the acquisition program 120A from the ROM 120 and functions, as an acquisition process 130A, on the RAM 130. Furthermore, the CPU 140 reads the setting program 120B from the ROM 120 and functions, as a setting process 130B, on the RAM 130.

The CPU 140 within the information processing apparatus 100 acquires communication information used for the first terminal to be coupled to a communication network via the second terminal. The CPU 140 sets the communication information in the first terminal or the second terminal and establishes, based on the communication information, with communication between the first terminal and the second terminal. As a result, a user is able to reduce a work burden at the time of setting the communication information in the first terminal or the second terminal.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication method using a communication system including a first communication apparatus, a second communication apparatus, and a communication management apparatus, the first communication apparatus being coupled to a communication network via the second communication apparatus, the communication method comprising:

acquiring, by the communication management, first device information identifying the first communication apparatus from the first communication apparatus by using a first wireless communication while the first communication apparatus and the second communication apparatus are not coupled to each other through any wireless communication path;

acquiring, by the communication management apparatus, second device information identifying the second communication apparatus from the second communication apparatus by using a second wireless communication while the first communication apparatus and the second communication apparatus are not coupled to each other through any wireless communication path;

executing, after said acquiring of the first device information and the second device information, at least one of transmitting the second device information from the communication management apparatus to the first communication apparatus and transmitting the first device information from the communication management apparatus to the second communication apparatus;

executing, after at least one of the transmitting of the second device information and the transmitting of the first device information, based on at least one of the first device information and the second device information, a negotiation for establishing the wireless communication path between the first communication apparatus and the second communication apparatus;

establishing, based on the negotiation, the wireless communication path between the first communication apparatus and the second communication apparatus;

and transmitting data between the first communication apparatus and the second communication apparatus using the established wireless communication path.

2. The communication method according to claim 1, wherein
the first device information is first address information of the first communication apparatus, and
the first address information is transmitted to the second communication apparatus by the communication management apparatus.

3. The communication method according to claim 2, wherein the first wireless communication is near field wireless communication (NFC).

4. The communication method according to claim 1, wherein
the second device information is second address information of the second communication apparatus, and
the second address information is transmitted to the first communication apparatus by the communication management apparatus.

5. The communication method according to claim 4, wherein
the second wireless communication is near field wireless communication (NFC).

6. A communication system coupled to a communication network, comprising:
a first communication apparatus including a first memory and a first processor coupled to the first memory;
a second communication apparatus, including a second memory and a second processor coupled to the second memory, configured to perform communication with the first communication apparatus, the first communication apparatus being coupled to the communication network via the second communication apparatus;
and a communication management apparatus including a third memory and a third processor coupled to the third memory, third processor being configured to
acquire, from the first communication apparatus using a first wireless communication, first device information identifying the first communication apparatus while the first communication apparatus and the second communication apparatus are not coupled to each other through a wireless communication path,
acquire, from the second communication apparatus using a second wireless communication, second device information identifying the second communication apparatus while the first communication apparatus and the second communication apparatus are not coupled to each other through the wireless communication path,
execute, after acquiring the first and second device information, at least one of transmitting the second device information to the first communication apparatus and transmitting the first device information to the second communication apparatus, and wherein the first and second processors are configured to
execute, after at least one of transmitting of the second device information and transmitting of the first device information, based on at least one of the first device information and the second device information, negotiation for establishing the wireless communication path between the first communication apparatus and the second communication apparatus, establish, based on the negotiation, the wireless communication path between the first communication apparatus and the second communication apparatus, and execute a data transmission between the first communication apparatus and the second communication apparatus using the established wireless communication path.

7. The communication system according to claim 6, wherein the first device information is first address information of the first communication apparatus, and the first address information is transmitted to the second communication apparatus.

8. The communication system according to claim 7, wherein the first wireless communication is near field wireless communication (NFC).

9. The communication system according to claim 6, wherein the second device information is second address information of the second communication apparatus, and the second address information is transmitted to the first communication apparatus.

10. The communication system according to claim 9, wherein the second wireless communication is near field wireless communication (NFC).

11. A communication management apparatus configured to manage a communication between a first communication apparatus and a second communication apparatus, the communication management apparatus comprising:

a memory; and a processor coupled to the memory and configured to acquire, from a first communication apparatus using a first wireless communication, first device information identifying the first communication apparatus, while the first communication apparatus and the second communication apparatus are not coupled to each other through a wireless communication path, acquire, from a second communication apparatus using a second wireless communication, second device information identifying the second communication apparatus, while the first communication apparatus and the second communication apparatus are not coupled to each other through the wireless communication path, execute, after acquiring of the first device information and after the acquiring of the second device information, at least one of transmitting the second device information to the first communication apparatus and transmitting the first device information to the second communication apparatus, wherein the first communication apparatus and the second communication apparatus are configured to:

execute, after the at least one of transmitting the second device information and transmitting the first device information, based on at least one of the first device information and the second device information, a negotiation for establishing the wireless communication path between the first communication apparatus and the second communication apparatus, establish, based on the negotiation, the wireless communication path between the first communication apparatus and the second communication apparatus, and execute a data transmission between the first communication apparatus and the second communication apparatus using the established wireless communication path.

12. The communication management apparatus according to claim 11, wherein the first device information is first address information of the first communication apparatus, and the processor is configured to receive first address information from the first communication apparatus, and transmit the first address information to the second communication apparatus.

13. The communication management apparatus according to claim 12, wherein the first wireless communication is near field wireless communication (NFC).

14. The communication management apparatus according to claim 11, wherein the second device information is second address information of the second communication apparatus, and the processor is configured to receive the second address information from the second communication apparatus, and transmit the second address information to the first communication apparatus.

15. The communication managing apparatus according to claim 14, wherein the second wireless communication is near field wireless communication (NFC).

\* \* \* \* \*